United States Patent [19]

Bell

[11] Patent Number: 4,579,374
[45] Date of Patent: Apr. 1, 1986

[54] JOINT STRUCTURE FOR CONNECTING HOLLOW MEMBERS

[75] Inventor: Michael G. Bell, Redditch, England

[73] Assignee: Hymatic Clamps International Limited, Redditch, England

[21] Appl. No.: 458,185

[22] Filed: Jan. 17, 1983

[30] Foreign Application Priority Data

Apr. 1, 1982 [GB] United Kingdom ................ 8209677

[51] Int. Cl.[4] ............................................. F16L 21/06
[52] U.S. Cl. .................................. 285/334.4; 285/410
[58] Field of Search ................... 285/334.4, 410, 411, 285/367, 366, 365, 407, 408, 409

[56] References Cited

U.S. PATENT DOCUMENTS

| | | | |
|---|---|---|---|
| 1,017,813 | 2/1912 | Schuermann | 285/334.4 X |
| 1,137,955 | 5/1915 | Dies | 285/334.4 X |
| 2,271,425 | 1/1942 | Harris | 285/367 |
| 2,302,617 | 11/1942 | Little | 285/334.4 X |
| 2,545,168 | 3/1951 | Richardson | 285/333.4 |
| 2,937,893 | 5/1960 | Hill et al. | 285/410 X |
| 3,180,662 | 4/1965 | Parlasca et al. | 285/334.4 X |
| 3,494,643 | 2/1970 | Longshaw et al. | 285/365 |
| 3,865,413 | 2/1975 | Mizusawa et al. | 285/411 X |
| 3,964,773 | 6/1976 | Stade et al. | 285/411 X |
| 4,343,499 | 8/1982 | Dumar, Jr. et al. | 285/334.4 X |

FOREIGN PATENT DOCUMENTS

| | | | |
|---|---|---|---|
| 684569 | 11/1939 | Fed. Rep. of Germany | 285/365 |
| 742568 | 12/1943 | Fed. Rep. of Germany | 285/365 |
| 2614477 | 10/1977 | Fed. Rep. of Germany | 285/410 |
| 83650 | 8/1964 | France | 285/410 |
| 417736 | 5/1947 | Italy | 285/367 |
| 165925 | 6/1921 | United Kingdom | 285/334.4 |
| 1126872 | 9/1968 | United Kingdom . | |

Primary Examiner—Thomas F. Callaghan
Attorney, Agent, or Firm—Marshall, O'Toole, Gerstein, Murray & Bicknell

[57] ABSTRACT

A joint structure between two pipes includes hollow members, one on each pipe, and a clamp embracing the hollow members. Each hollow member has a lip at its end which is adjacent to the other hollow member and the lips are held in mutual engagement by the clamp.

2 Claims, 1 Drawing Figure

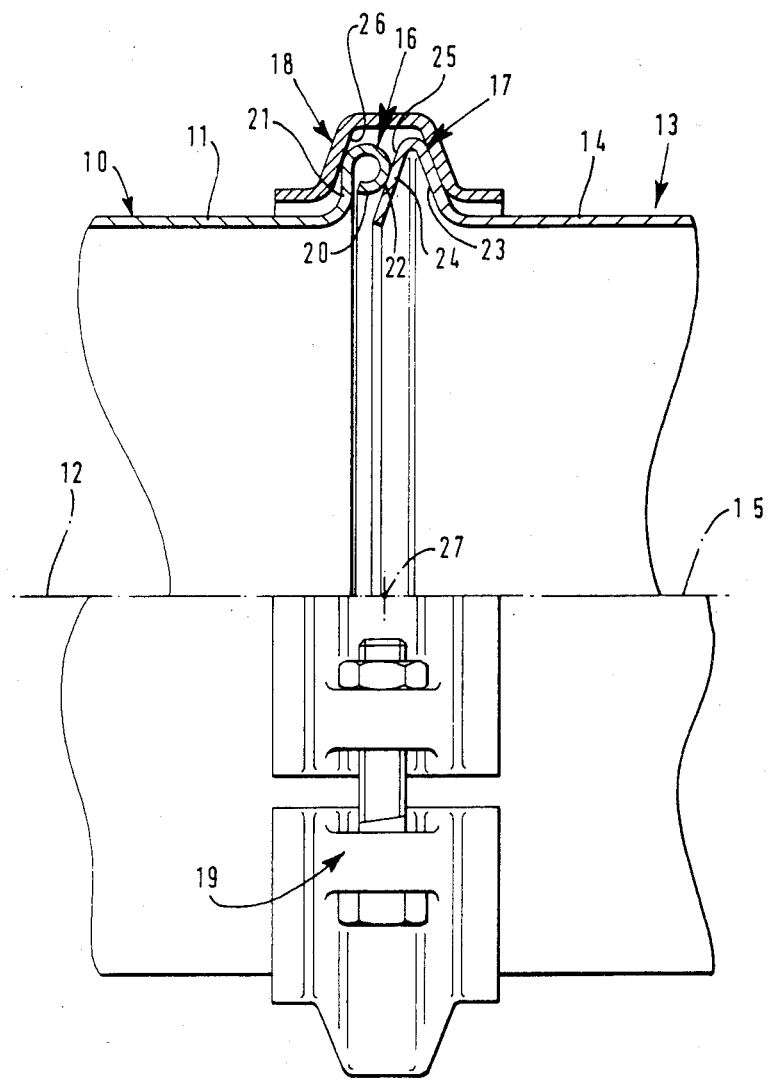

JOINT STRUCTURE FOR CONNECTING HOLLOW MEMBERS

SUMMARY OF THE INVENTION

This invention relates to a joint structure suitable for connecting pipes and to a method of joining pipes.

There is a requirement for connections between pipes, which connections are rigid and fluid-tight (even when the pipes are not exactly coaxial), do not involve heavy components and which are so arranged that, immediately prior to final tightening of the connections, adjustment of the angular relation between axes of the pipes can be effected to leave the pipes in a selected angular relation, in which the connection is finally tightened.

According to the present invention, there is provided a joint structure comprising first and second hollow members and a clamp embracing said members, each of the hollow members having a lip at one end adjacent to the other member and the lips being held in mutual engagement by the action of the clamp, characterised in that the lip of at least one of said members is hollow.

In the preferred joint structure, at least one of the lips and preferably each of the lips presents towards the other lip a convex seating face.

Also in the preferred joint structure, said one member has an axis and a wall which is spaced from and extends completely around the axis and the cross-section of the lip of said one member in a plane containing the axis includes a loop. The loop may be a closed loop but is preferably an open loop. An open loop has more flexibility than does a closed loop which is otherwise similar.

There is also provided in accordance with the invention a joint structure between two pipes, the pipes having at mutually adjacent ends respective lips, each lip including a seating portion and a connecting portion connecting the seating portion with the remainder of the pipe, each connecting portion extending radially outwardly from an adjacent part of the pipe, each seating portion extending radially inwardly from the connecting portion, each seating portion presenting towards the other seating portion a convex seating face and one seating face being more severely curved than is the other seating face.

There is also provided in accordance with the invention a method of forming a joint between two pipes wherein respective lips are provided on the pipes at ends thereof at which the joint is to be made, each lip including a seating portion and a connecting portion connecting the seating portion with the remainder of the pipe, each connecting portion extending radially outwardly from an adjacent part of the pipe, each seating portion extending radially inwardly from the connecting portion to define between the seating portion and the connecting portion a space within the lip, bringing respective seating faces of the seating portions into mutual engagement and applying a clamp to the lips to maintain the seating faces in engagement.

BRIEF DESCRIPTION OF THE DRAWING

One example of a joint structure in accordance with the invention will now be described, with reference to the accompanying drawing, which shows an elevation of a joint structure between two pipes, one half of the joint structure being shown in cross-section in a plane containing a longitudinal axis of one of the pipes.

DETAILED DESCRIPTION

The joint structure illustrated in the accompanying drawing comprises a first pipe 10 having a cylindrical wall 11 defining an axis 12 and a second pipe 13 having a cylindrical wall 14 defining an axis 15 of the second pipe. The pipes are at least approximately coaxial and have at their mutually adjacent ends respective lips 16 and 17. The lips are held in mutually abutting relation by a band clamp 18 which embraces the lips 16 and 17. The band clamp is of known form an includes a screw and nut mechanism 19 for tightening the clamp onto the lips 16 and 17.

As shown in the cross-section, the lip 16 is hollow, having an internal space defined between a seating portion 20 of the lip and a connecting portion 21. The connecting portion 21 of the lip extends radially outwardly from the wall 11 to the extremity of the lip 16 which is furthest from the axis 12. The seating portion 20 curls inwardly from that extremity towards the axis. As can be seen from the drawing, the connecting portion merges smoothly with the wall 11 and with the seating portion and the cross-section of the seating portion is an arc of a circle. Accordingly, the seating portion 20 presents towards the lip 17 a convex surface 22.

Between the connecting portion 21 and the seating portion 20 of the lip 16, there is defined a space which is almost closed off from the interior of the pipe 10. This space communicates with the interior of the pipe through a narrow gap between the connecting portion 21 and the free edge of the seating portion 20. As seen in the drawing, the lip 16 forms a loop which is almost closed.

The radius of curvature of the seating face 22, as viewed in cross-section in a plane containing the axis 12, is substantially less than the distance from the lip 16 to the axis 12 and is also less than the distance from the external surface of the cylindrical part 11 of the pipe 10 to the radially outermost extremity of the lip 16.

The lip 17 also is hollow, comprising a connecting portion 23 and a seating portion 24 which are generally spaced apart along the axis 15 to provide between them a space within the lip. The connecting portion 23 extends radially outwardly from the wall 14 to that extremity of the lip 17 which is furthest from the axis 15 and the seating portion 24 extends from this extremity towards the axis 15 to a position spaced from that axis by approximately the same distance as the wall 14 is spaced from that axis. The outer extremities of the lips 16 and 17 are spaced approximately equally from the axes 12 and 15 respectively. Preferably, the outer extremity of the lip 16 is slightly nearer to the axis 12 than is the outer extremity of the lip 17 to the axis 15. This facilitates relative angular movement of the pipes 10 and 13, as hereinafter described.

The connecting portion 23 merges smoothly with the wall 14 and with the seating portion 24. As shown in the drawing, the connecting portion 23 presents an external, frusto-conical surface for engagement by the clamp 18, this surface being inclined to the axis 15 at an angle of 70°. The seating portion 24 diverges from the connecting portion 23 in a direction from the outer extremity of the lip towards the axis 15.

The seating portion 24 presents for engagement with the seating face 22 a convex seating face 25 of part-spherical form. As viewed in cross-section in the drawing, the seating portion 24 mainly has the form of an arc of a circle having a radius which is considerably greater than the radius of the wall 14. As compared with the curvature of the seating face 22, the curvature of the seating face 25 is only slight.

The connecting portion 21 has a substantially flat, annular surface and the clamp 18 has a frusto-conical internal surface 26 which engages the curved surface of the connecting portion 21 between the flat surface thereof and the outer extremity of the lip 16. The surface 26 is substantially parallel to the seating surface 25. Accordingly, relative angular movement of the pipes 10 and 13 about a point (not shown) on the axis 15 spaced from the centre 27 of the joint can be accommodated by movement of the lip 16 relative to the lip 17 and clamp 18 whilst the lip 16 remains in contact with the seating surface 25 without requiring any substantial change in the distance between the seating surface 25 and the internal surface 26 of the clamp. By the reference to these surfaces being substantially parallel, we mean the separation between the surfaces is substantially the same at all positions around the axis 12 and over a limited distance in a direction radially of the pipe.

The pipes 10 and 13 and the clamp 18 are preferably formed of metal, for example steel. The walls 11 and 14 may include joints (not shown) between main portions of the pipes and end portions which include the lips 16 and 17.

When the joint structure is to be assembled, a clamp 18 is placed around one of the lips and the pipes 10 and 13 are placed in approximately coaxial relation with the lips 16 and 17 abutting. The clamp is engaged over both lips and is then tightened just sufficiently to maintain the lips in engagement with each other, without establishing substantial friction between the lips. The pipes are then adjusted by relative angular movement about the centre of the joint 27 until either the pipes are set in a coaxial relation or the required angular relation between the axes 12 and 15 is established. During this adjustment, the lip 16n slides on the surface 25 of the lip 17 but the lip 16 does not jam between the faces 25 and 26 because of the uniform separation between these faces. The clamp is subsequently tightened to establish the required pressure between the seating faces 22 and 25. It will be noted that, owing to the relatively severe curvature of the seating face 22, contact between the seating faces will approximate to line contact and a fluid-tight seal between the lips will be established without the use of elastomeric seals. During tightening of the clamp, the seating portion 24 can flex relative to the connecting portion 23 by resilient deformatiion of the lip. The seating portion 20 may also flex relative to the connecting portion 21 in a similar way, but, with the configuration shown in the drawing, flexing of the lip 16 will be slight, as compared with that of the lip 17. In this way, excessive variations in the contact pressure between positions spaced around the axis 12 is avoided.

The lip 17 illustrated in the accompanying drawing may be so modified that the wall 14 extends to and merges with the seating portion 24 and the portion 23 has a free edge adjacent to the wall 14, the portion 23 being connected with the wall via the seating portion. With this arrangement, the seating portion 24 and the portion 23 would be spaced apart as shown in the drawing to form a hollow lip. The modified lip would be capable of flexing under the action of the clamp to avoid excessive variations around the joint in the contact pressure at the lips. In the modified lip, the portions 23 and 24 may join at a bend, as shown in the drawing, or there may be interposed between these portions a third portion, for example a portion of approximately cylindrical form, so that the portions 23 and 24 are spaced further apart. In the modified lip, the portions 23 and 24 diverge in a direction towards the axis 15.

The modified lip 17 described in the immediately preceding paragraph may be used in conjunction with a lip 16 as shown in the drawing or in conjunction with a lip which is not hollow and is substantially parallel to the portion 24.

In an alternative modification, the seating portion 20 may be extended up to the connecting portion 21 so that the lip 16 forms a closed loop, as viewed in cross-section.

I claim:

1. A joint structure comprising first and second hollow members defining respective axes, each having a wall spaced from and extending completely around the axis defined by the member and a lip at one end of said wall adjacent to the other member, the lips being in mutual engagement at a contact region, and a clamp embracing the first and second members and holding the lips engaged with each other, wherein the lips of said members are hollow, each lip presents towards the other in the proximity of the contact region a seating surface which, when viewed in cross-section in a plane containing said axis of the first member, is convex, the seating surface of said first member is part-spherical, the lip of said first member, when viewed in cross-section in a plane containing the axis of the first member, includes a connecting portion extending from said wall of the first member in a direction away from the axis thereof and a seating portion extending from the connecting portion towards the axis of the first member and which presents the seating surface of the first member, the lip of said second member when viewed in cross-section in said plane is in the form of a loop, the seating surface of said second member has a radius substantially smaller than the radius of said part-spherical seating surface and said clamp comprises a band which, when viewed in cross-section in a plane perpendicular to said axis of the first member, substantially surrounds the joint and, when viewed in cross-section in a plane containing said axis of the first member, engages both the first and second members.

2. A joint structure according to claim 1 wherein the second hollow member defines a second axis parallel to its length and said second axis is inclined to said first axis.

* * * * *